United States Patent [19]

Weiss et al.

[11] Patent Number: 5,189,711

[45] Date of Patent: Feb. 23, 1993

[54] AUTOMATIC DETECTION OF ELLIPTICAL SHAPES

[76] Inventors: Isaac Weiss, 3450 Toledo Terr., #410, Hyattsville, Md. 20782; Azriel Rosenfeld, 847 Loxford Terr., Silver Spring, Md. 20901

[21] Appl. No.: 800,472

[22] Filed: Sep. 9, 1991

Related U.S. Application Data

[63] Continuation-in-part of Ser. No. 440,714, Nov. 24, 1989.

[51] Int. Cl.$^5$ .............................................. G06K 9/46
[52] U.S. Cl. ........................................ 382/25; 382/8; 382/46
[58] Field of Search ................................ 382/8, 25, 46

[56] References Cited

U.S. PATENT DOCUMENTS

| 3,069,654 | 12/1962 | Hough | 382/1 |
| 4,618,989 | 10/1986 | Tsukune et al. | 382/25 |
| 4,769,850 | 9/1988 | Itoh et al. | 382/25 |

OTHER PUBLICATIONS

"Detection of Ellipses by a modified Hough Transform," by Tsuji and Matsumoto, IEEE Transactions on Computers, (Aug. 27, 1978), pp. 777-781.

Primary Examiner—David K. Moore
Assistant Examiner—Barry Stellrecht

[57] ABSTRACT

A method is described for automatic detection of a large class of industrial parts, whch is faster and more reliable than current methods. Many industrial parts have visible outlines which are either circular or elliptical or contain segments of these. Circles are seen as ellipses unless viewed head-on. Thus the ability to detect ellipses in an image of an industrial part, quickly and reliably, can be of great help in identification of this part by a robotic assembly process. In our method one first scans the image electronically by a video camera. When a scan line goes through an image of some object one can detect the edges of this image by detecting changes in the light intensity at these edges. For an object of the shape of a conic section (e.g. an ellipse), generally two edges will appear on each scan line and the midpoints between them will all lie on one straight line. This straight line can be detected with Hough's method.

1 Claim, 3 Drawing Sheets

AUTOMATIC DETECTION OF ELLIPTICAL SHAPES

This application is a continuation-in-part of application Ser. No. 07/440,714, filed Nov. 24, 1989.

BACKGROUND

1. Field of the Invention

The invention generally relates to a pattern recognition system, and in particular to detecting an image of an object which has the shape of a conic section, including a circle, an ellipse, a parabola and a hyperbola.

2. Description of Prior Art

One of the major problems in automatic assembly is detecting and identifying the parts to be assembled when the parts lie in a bin or on a conveyer belt in an unknown position and/or orientation. In current methods, one takes a video image of the object, then finds edges in this image, i.e. sharp changes in the light intensity, which are generated by the outlines or other features of the object. The resulting "edge map" is then processed to identify the object. If the position and orientation of the object are known in advance then one can compare the edge map with a data-base of edge maps obtained from known objects and determine if there is a match. However, for an objects in arbitrary position and orientation (the usual case) one would have to shift and rotate the image in every possible way and try to find a match for each possible position and orientation, which is prohibitively expensive.

Most methods used to deal with this difficulty are based on the Hough method (the patent cited), most commonly applied to finding straight lines. The Hough method for straight lines is as follows. A line can be described by two parameters, e.g. the slope and intercept. One constructs a parameter space, in this case a plane with the slope and intercept as its coordinates. At each edge point in the edge map it is possible to draw a bundle of lines, all having different slopes, and all passing through that edge point. This bundle is represented in the parameter space by a straight line whose points are the parameters of the lines belonging to the bundle. For each point on the edge map one draws the corresponding line in the parameter space. If the edges lie on one straight line in the edge map (i.e. there is a visible line in the image), then the corresponding lines in the parameter space will meet at one point. This is because the line on which the visible edges lie is common to all the line bundles passing through the edges. The parameters of this line are the coordinates of the common point in the parameter space. Thus, by searching for common points in the parameters space, one can find lines in the image without a prior knowledge of their position or orientation. The method is already implemented on a VLSI chip.

The method can be extended to more complicated shapes. The higher number of parameters involved leads to a parameter space of high dimensionality which becomes impractical to store and conduct searches in. However, most industrial parts contain, besides straight lines, segments which are circular or elliptic or seen as such. E.g. a side view of a circle is seen as an ellipse, thus detection of ellipses is essential. It is also sufficient in many applications because a side view of an ellipse is just another ellipse, making an ellipse detection method useful for a wide variety of applications.

To use the Hough method for ellipse detection would require searching for common points in a five dimensional parameter space, which is the minimum needed to described an ellipse (and other conic sections) and this is impractical for current machines. Therefore it is highly desirable to reduce the dimensionality of the problem to two and thus make the detection of conic sections as practical as the detection of straight lines.

Tsukune et al describe a method of reducing the dimensionality of the parameter space needed. They find edges in the images and the directions of these edges. For each pair of edges having the same direction, they find the midpoint between the edges. They histogram all the midpoints in a two dimensional array to find the most probable location of a center of an ellipse. In the next step a second two dimensional histogram (the H-B histogram) is needed to find two more parameters of the ellipse. A final histogram, involving all pairs of edges possibly belonging to an ellipse, is used to find the last ellipse parameter. Similar methods are used in the other references cited.

There are several problems with these methods. Finding the location of edges in the image is quite difficult because of noise and other distorsions in the image. Finding directions of the edges, i.e. the direction of a small line segment separating the light and dark patches in the image around a certain location, is much harder and the results are very unreliable as is well known to persons skilled in the art. This is because a direction involves finding the location of at least two nearby points on this edge line segment, and a small error in one of them leads to a large error in the direction. Therefore, the centers found based on this information are unreliable and need a high amount of processing to reject the incorrect ones.

Another problem is the several stages of complicated histogramming needed in these methods which are time and memory consuming.

BRIEF DESCRIPTION OF THE INVENTION

The purpose of the invention is to detect elliptical or circular objects in a more reliable way and with significant savings in computer time and memory requirement compared with previous methods. This is done by eliminating the need for finding the directions of the edges. Only their location is needed in our method. In addition, the complex H-B histogram of Tsukune's method is eliminated. Also, in the final histogramming step we need not account for all *pairs* of edges of an ellipse, only individual edges, which again saves resources.

The basic principle of the invention is a the following geometric theorem (FIG. 1): if we draw a set of parallel chords in an an ellipse, regardless of their orientation, than the midpoints of the chords all lie on one straight line. This line passes through the center of the ellipse.

In general such a property is called skew symmetry, i.e. the left and the right parts of the shape are at an equal distance from the line but this distance is not measured perpendicularly to this symmetry line. The corresponding line is a line of skew symmetry. (For an ellipse it is called a diameter.) Thus, by the theorem, the ellipse is skew symmetric in any orientation.

The invention consists of a video camera connected to a computer that can process the camera output according to our method. The camera works by scanning the image of the object projected on some light sensitive screen and converting the light intensity into an electrical signal. The scan lines correspond to the parallel chords described above. The computer can detect changes in the electrical signal, namely edges of the image, and calculate the mid-points. All the mid-points are fed to a standard line detector that detects the lines of skew symmetry, if they exist.

Of course one line of skew symmetry does not determine an ellipse. Therefore, the camera is rotated to find skew symmetries in other orientations, and then all the information is combined to find the parameters of the ellipse.

DETAILED DESCRIPTION OF THE PREFERRED EMBODIMENT

Figure 1:
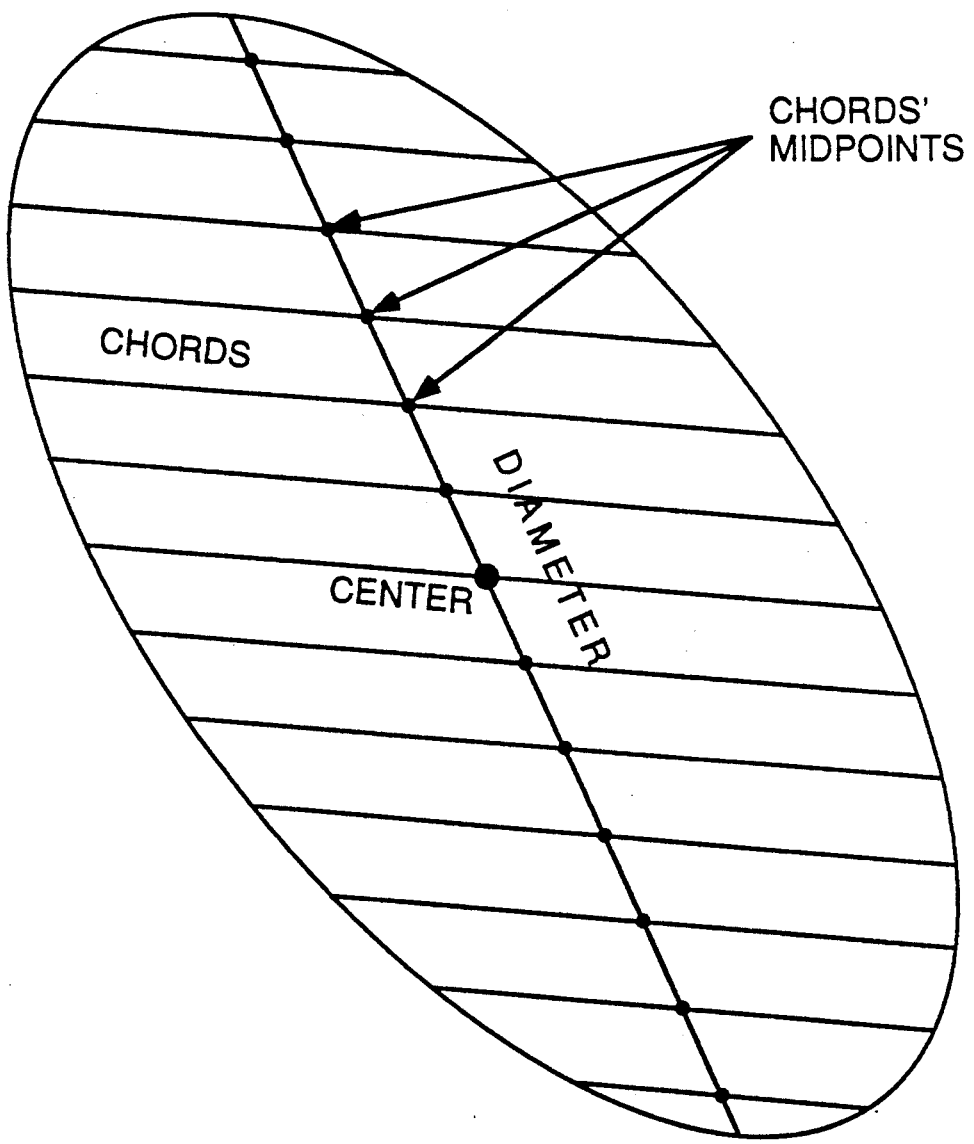
FIG. 1 illustrates the geometrical theorem referred to. The parallel lines in the ellipse are the chords, and their midpoints lie on a diameter, or skew symmetry line, passing through the center.
Figure 2:
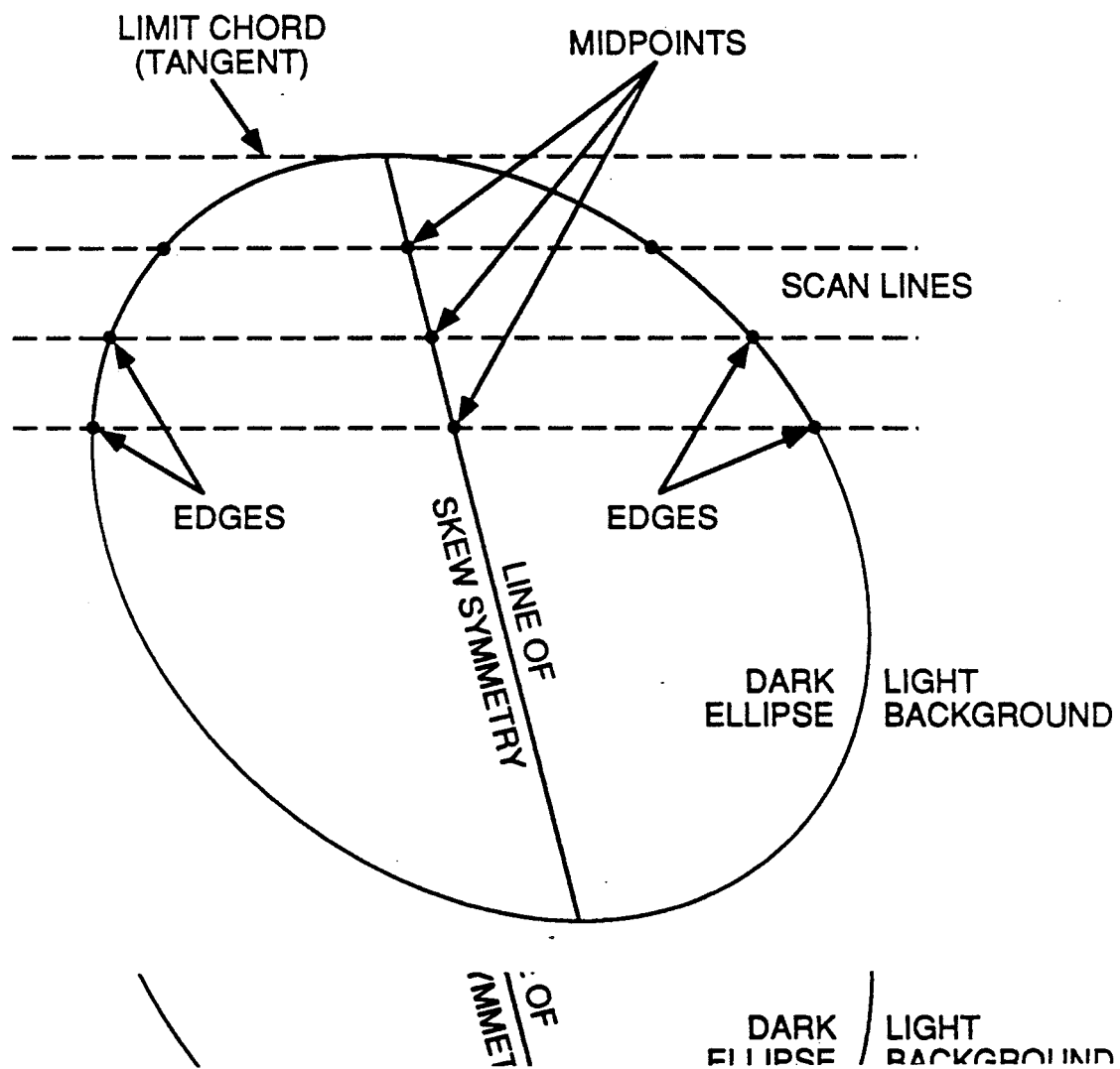
FIG. 2 shows the a practical use of the theorem. The parallel lines are scan lines of a video camera, and the ellipse consists of edge points in the image.
Figure 3:
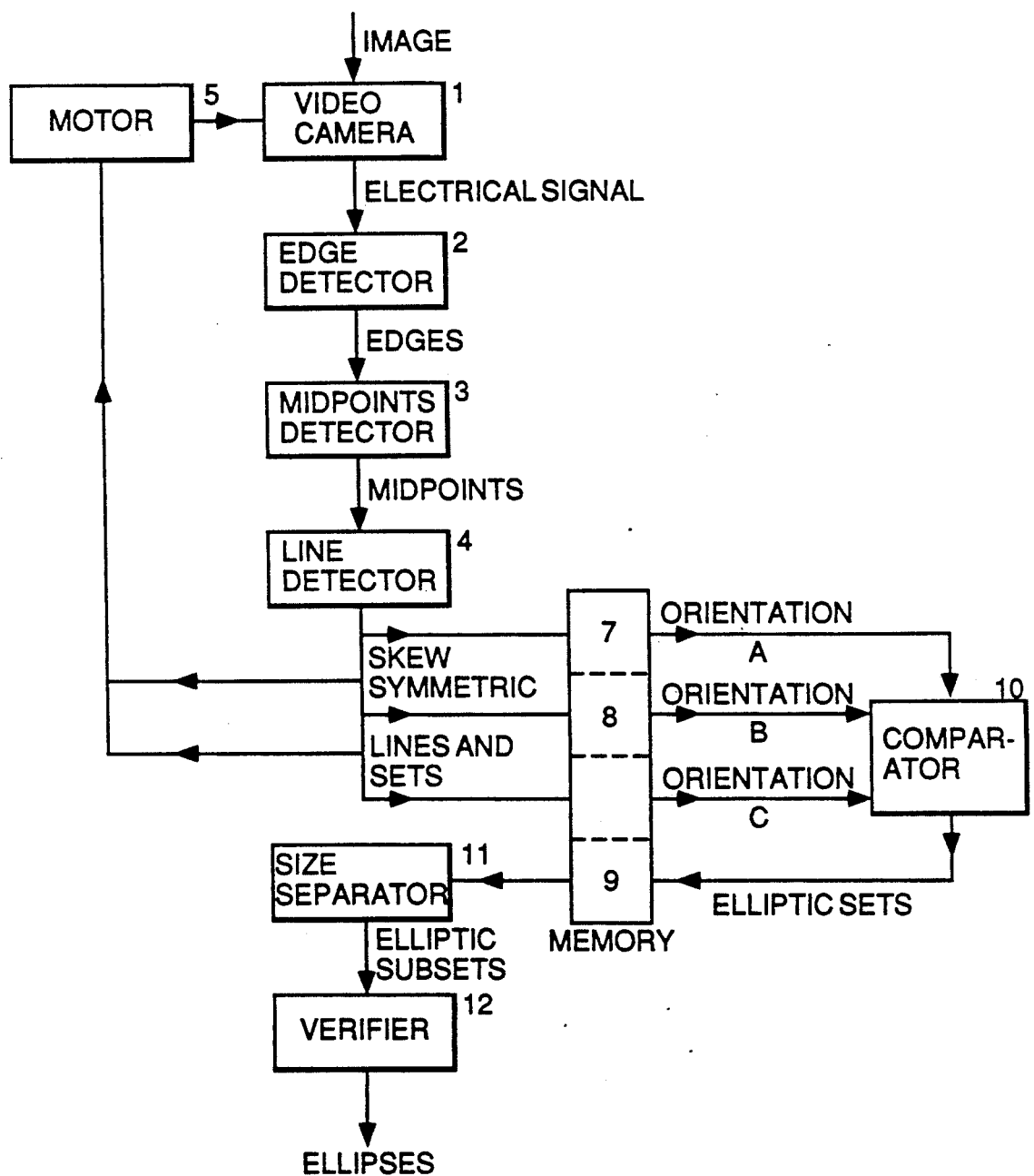
FIG. 3 is a block diagram of our system.

FIG. 3 shows a block diagram of the preferred embodiment. An image detector such as a video camera (1) converts the optical energy into an electrical signal by scanning the image along parallel lines and producing a signal whose strength relates to the brightness of the image points that are scanned. An edge detector (2) finds sharp changes in the electrical signal, and registers their location within the image in a computer memory. The computer calculates the midpoint between each pair of edges belonging to the same scan line (3). The coordinates of the midpoints are sent to a line detector (4), to check if some of the midpoints lie along a straight line. Standard line detectors based on Hough's method or other methods are widely available either in hardware or software. A lines thus detected is called a skew symmetry line, and the set of edges that gave rise to it is a skew symmetric set. Each such line and the corresponding set of edges are stored in memory area (7) under a common label.

Assuming that lines have been detected, a signal is sent to a motor (5) that rotates the camera (1) in some predetermined angle. The process is now repeated to detect a second group of skew symmetry lines and sets. These are stored in memory area (8).

The skew symmetry sets from storage areas (7), (8) are compared by the comparator (10) to see if any pair of skew symmetric sets, one from (7) and one from (8), contain a common set of edges. This can be done efficiently by common methods of set intersection. The process is repeated to find a set with a third skew symmetry line. If there is such a set, it potentially consists of an ellipse, or a group of elliptical contours all having the same center, orientation and eccentricity, and it is considered an "elliptical set". The center coordinates, the orientation and the eccentricity of each such elliptical set is calculated from the parameters of the two corresponding skew symmetry lines by known mathematical formulas. These ellipse parameters, along with the corresponding elliptical set of edges, are stored under a common label in storage area (9).

Each set stored in area (9) possibly contains a group of elliptical contours differing only by size. Each such set is sent to the size separator (11). Given the known orientation and eccentricity of the set, the separator perform a geometrical (affine) transformation on it that makes the set circular. It now contains a set of circular contours rather than elliptical ones. The separator now calculates the distances of the edges from the center and creates a histogram showing how many edges appear at (or around) each distance. This is done by assigning a memory cell to each possible distance (within some specific tolerances) and accumulating in this cell the edges having this distance. If the set indeed contains several circular contours, high numbers of edges will fall at particular distances, the radii of the circles. The separator extracts these radii and the subsets of edges corresponding to them. Each such subset corresponds to an ellipse in the original image.

The verifier (12) takes each subset of edges found by the separator, with the original coordinates of the edges comprising it. All five parameters of this elliptical contours are now known. However, better accuracy can be obtained by direct fitting of an ellipse to the subset, using standard least squares fitting. There is no search involved now because the subset represents only one contour. The "goodness of fit" can now be estimated by calculated the average distance of the edges in the elliptical subset from the ellipse that was fitted to the subset. If this distance is small than an ellipse has been detected.

Although described as being useful for detection of conic section shapes in an industrial environment, this disclosure does not limit the invention to the intended use, since it is believed that there are numerous other fields of uses for this invention.

As will be apparent to one skilled in the art, numerous modifications and variations of the invention, in addition to those recited above, may be easily made without departing from the spirit and the scope of the invention.

What is claimed is:

1. A method of detection of a plurality of objects, or parts of objects, having circular, elliptical, parabolic or hyperbolic shapes, within an image containing many different objects, comprising of the following steps:
    a) transducing an optical image into an electrical signal representing the grey level (brightness) of the image at each point (x, y) using a camera;
    b) finding local changes in brightness along x which are large enough to be regarded as edges of an object;
    c) finding the midpoint between any two edges lying on the same scan line, i.e. a line that is parallel to the image's x axis;
    d) feeding all the midpoints from above into a straight line detector; keeping a record of the parameters of each skew-symmetry line thus detected, as well as the skew symmetric set of edges that gave rise to it;
    e) rotating the camera around its optical axis using a motor and repeating previous steps (a) through (d), to find from the edges in memory sets of edges that have a second line of skew symmetry; keeping in memory each such set of edges and its two skew symmetry lines;
    f) rotating the camera again, repeating previous steps (a) through (d) and finding all sets of edges having three skew symmetry lines; thus finding sets consisting possibly of ellipses with the same center, orientation and eccentricity;
    g) calculating from the parameters of the skew symmetry lines of the sets found in (f), and from the scan line rotation angles, the intersection point of the lines (the center), the orientation and the eccentricity of the possible ellipses;

h) eliminating the orientation and eccentricity found in (g) by means of of a geometrical transformation for each elliptical set found in (f), transforming the ellipses into circles;

i) histograming the distances of the edges from the center for each circular set found in (h), and separating the set of edges into subsets of edges having the same distance from the center.

* * * * *